(12) United States Patent
Yasui

(10) Patent No.: US 9,568,979 B2
(45) Date of Patent: Feb. 14, 2017

(54) COMMUNICATION DEVICE FOR PROCESSING TARGET DATA QUICKLY

(71) Applicant: KYOCERA Document Solutions Inc., Osaka (JP)

(72) Inventor: Yoshiaki Yasui, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 274 days.

(21) Appl. No.: 14/317,862

(22) Filed: Jun. 27, 2014

(65) Prior Publication Data

US 2015/0006936 A1    Jan. 1, 2015

(30) Foreign Application Priority Data

Jun. 29, 2013 (JP) ................................ 2013-156384

(51) Int. Cl.
*G06F 1/26* (2006.01)
*G06F 1/00* (2006.01)
(Continued)

(52) U.S. Cl.
CPC ........... *G06F 1/3234* (2013.01); *G06F 1/3209* (2013.01); *G06F 1/3284* (2013.01); *H04L 12/10* (2013.01); *Y02B 60/1267* (2013.01); *Y02B 60/32* (2013.01)

(58) Field of Classification Search
CPC .... G06F 1/3234; G06F 1/3209; G06F 1/3284; H04L 12/10; Y02B 60/1267; Y02B 60/32
(Continued)

(56) References Cited

U.S. PATENT DOCUMENTS 7,343,500 B2 * 3/2008 Igari ..................... G06F 1/3203
                                                    713/300
2007/0150763 A1 * 6/2007 Yang .................... G06F 1/3203
                                                    713/300
(Continued)

FOREIGN PATENT DOCUMENTS

JP    2003-179717 A    6/2003
JP    2006-245764 A    9/2006
JP    2010-267067 A   11/2010

OTHER PUBLICATIONS

Japanese Office Action dated Aug. 25, 2015, issued to Japanese Application No. 2013-156384.

*Primary Examiner* — Robert Cassity
(74) *Attorney, Agent, or Firm* — Stein IP, LLC

(57) ABSTRACT

A communication device for communicating via a telecommunication line includes a plurality of operating units, an energy-saving control unit, an instruction receiver, and a wake-up unit. The plurality of operating units are configured to receive an electric power and operate. The energy-saving control unit is configured to alternatively run a normal mode or an energy saving mode. The instruction receiver is configured to receive an instruction for selecting the operating unit that processes target data. The selection instruction is transmitted from a transmission device connected via the electric communication line prior to the transmission of the target data. The wake-up unit is configured to supply the electric power to the operating unit so as to wake up the operating unit from the sleep state upon receiving the selection instruction during the energy saving mode if the operating unit instructed by the selection instruction is in the sleep state.

1 Claim, 7 Drawing Sheets

(51) Int. Cl.
*G06F 1/32* (2006.01)
*H04L 12/10* (2006.01)

(58) Field of Classification Search
USPC .......................................................... 713/323
See application file for complete search history.

(56) References Cited

U.S. PATENT DOCUMENTS

2010/0290074 A1\* 11/2010 Kuroishi ............ G03G 15/5004
358/1.14
2013/0132753 A1\* 5/2013 Priel ..................... G06F 1/3203
713/323

\* cited by examiner

FIG. 3

| Functions | Operating Unit Required To Operate At Time Of Running Function |
|---|---|
| Relay Transmission | Facsimile Communication Unit |
| Confidential Reception | Facsimile Communication Unit<br>Image Memory |
| Facsimile Reception | Facsimile Communication Unit<br>Image Forming Unit |

COMMUNICATION DEVICE FOR PROCESSING TARGET DATA QUICKLY

CROSS-REFERENCE TO RELATED APPLICATION

This application is based upon, and claims the benefit of priority from, corresponding Japanese Patent Application No. 2013-156384, filed in the Japan Patent Office on Jul. 29, 2013, the entire contents of which are incorporated herein by reference.

BACKGROUND OF THE INVENTION

Unless otherwise indicated herein, the description in this section is not prior art to the claims in this application and is not admitted to be prior art by inclusion in this section.

There is known a communication device that receives an instruction for processing target data transmitted from an external device via a network and processes the target data according to the received instruction. It is also known for such a communication device to alternatively runs a normal mode in which all the operating units inside the device are powered, and an energy saving mode in which an operation unit or only some operating units, such as a communication control unit for receiving an instruction for processing target data from an external device via a network, are powered and the other operating units are not powered and in the sleep state.

Such a communication device, upon receiving an instruction for processing target data via a network from an external device under the energy saving mode, causes a predetermined operating unit to process the target data according to the received instruction after running the normal mode to resume powering all the operating units. As a result, such a communication device is apt to unnecessarily power the operating units not required for processing the target data.

A certain technique, for example, adopts a Multi-Function Printer (MFP) that, for each job, maps in advance an IP address to a combination of function blocks required to be operated at the time of running the job, and stores them. When causing the MFP to execute a job, the external device specifies an IP address mapped to the job as its destination, and transmits a job execution instruction. The MFP receives the job execution instruction in a communication unit corresponding to the IP address specified by the external device, and then, use the stored information in advance to recognize the job mapped to the IP address and the combination of the function blocks mapped to the job. Then the MFP only powers the function blocks included in the recognized combination and executes the job. The MFP thus avoids unnecessarily powering a function block not required for executing a job.

SUMMARY OF THE INVENTION

A communication device for communicating via a telecommunication line according to the disclosure includes a plurality of operating units, an energy-saving control unit, an instruction receiver, and a wake-up unit. The plurality of operating units are configured to receive an electric power and operate. The energy-saving control unit is configured to alternatively run a normal mode or an energy saving mode. The normal mode supplies the electric power to the plurality of operating units. The energy saving mode supplies the electric power to a predetermined part of the plurality of operating units and suspending another part of the plurality of operating units into a sleep state where the electric power is cut off. The instruction receiver is configured to receive an instruction for selecting the operating unit that processes target data. The selection instruction is transmitted from a transmission device connected via the electric communication line prior to the transmission of the target data. The wake-up unit is configured to supply the electric power to the operating unit so as to wake up the operating unit from the sleep state upon receiving the selection instruction during the energy saving mode if the operating unit instructed by the selection instruction is in the sleep state.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3 illustrates exemplary information stored in a functional information storage unit according to the one embodiment;

DETAILED DESCRIPTION OF THE EMBODIMENTS

Figure 1:
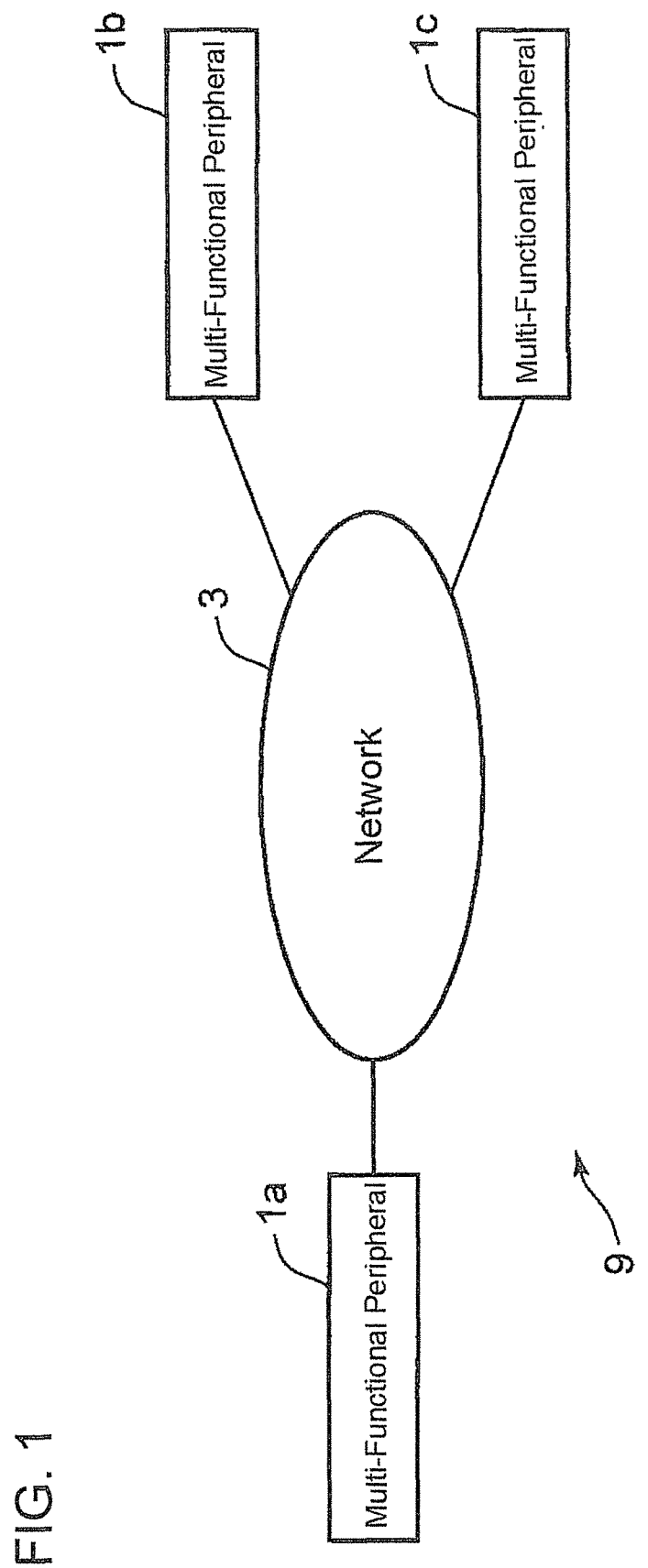
FIG. 1 illustrates a schematic configuration of a data communication system in a communicate system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

First Embodiment

The following describes a communication device according to the disclosure and a communication system including the communication device. FIG. 1 illustrates a schematic configuration illustrating a data communication system 9 according to an embodiment of a communicate system of the disclosure.

As illustrated in FIG. 1, the data communication system 9 is made up of multi-functional peripherals 1a-1c (communication devices) connected to a network 3 such as the Internet, a LAN (Local Area Network), or a telephone network (telecommunication line).

The multi-functional peripherals 1a-1c each send and receive various data between another multi-functional peripheral connected to the network 3 and an external device such as a personal computer (not illustrated) via the network 3. For example, the multi-functional peripherals 1a-1c conduct facsimile communication of sending and receiving image data between another multi-functional peripheral connected to the network 3 and a facsimile device (not illustrated) via the network 3. Hereinafter the multi-functional peripherals 1a-1c will be referred to as a multi-functional peripheral 1 as a whole.

Figure 2:
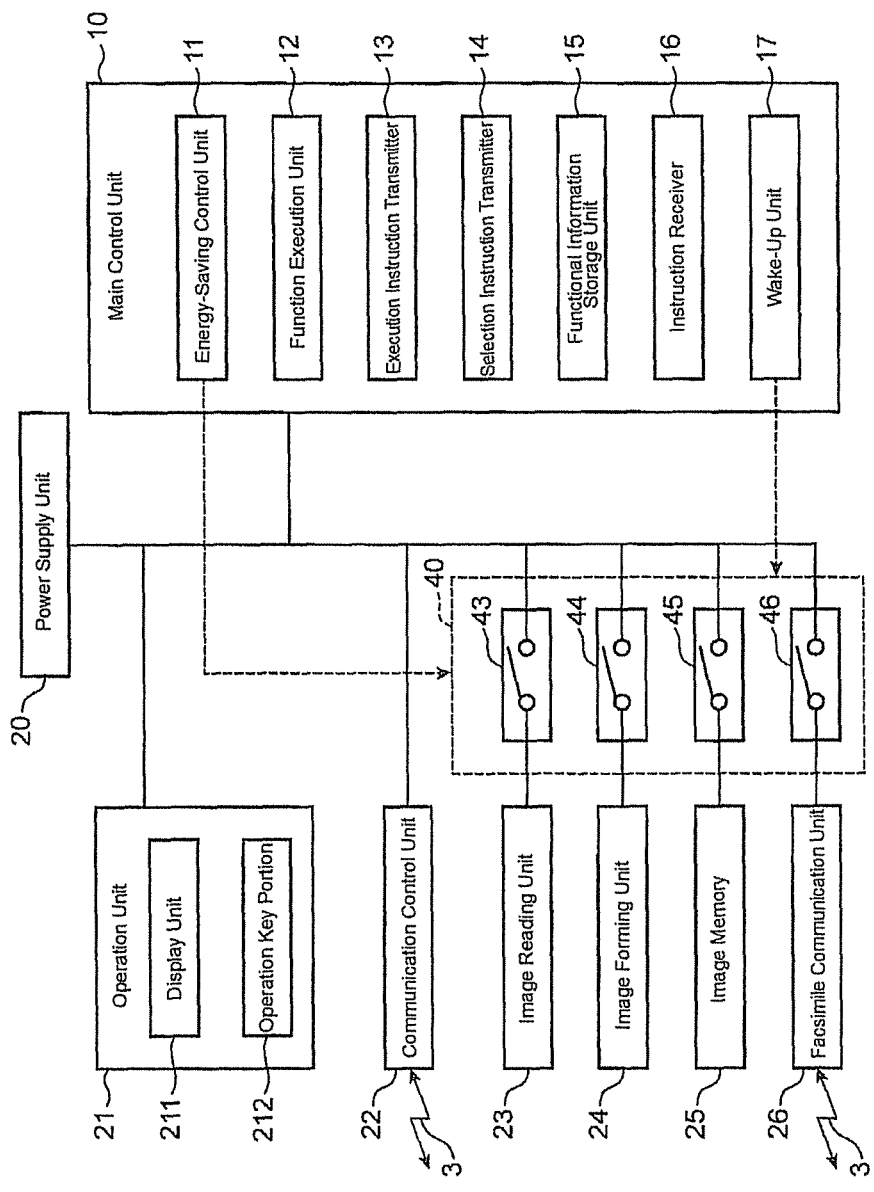
FIG. 2 illustrates an electrical configuration of a multi-functional peripheral in the communication device according to the one embodiment of the disclosure.

FIG. 2 illustrates an electrical configuration of a multi-functional peripheral 1 in the communication device according to one embodiment of the disclosure. As illustrated in FIG. 2, the multi-functional peripheral 1 includes a power supply unit 20, an operation unit 21, a communication control unit 22, a switch unit 40, an image reading unit 23, an image forming unit 24, an image memory 25, a facsimile communication unit 26, and a main control unit 10.

The power supply unit 20 converts an AC voltage supplied from an AC power supply, such as a commercial power supply, into a predetermined value of DC voltage with an AC-DC converter (not illustrated). Accordingly, the power supply unit 20 generates a power supply voltage for operating each operating unit inside the multi-functional peripheral 1. Each operating unit indicates the operation unit 21, the communication control unit 22, the image reading unit 23, the image forming unit 24, the image memory 25, the facsimile communication unit 26, and the main control unit 10, all of which operate with a supply of a power supply voltage (electric power) generated by the power supply unit 20.

The switch unit 40 includes switches 43, 44, 45, and 46, which are turned on and off (open and close) under a control of the main control unit 10. Turning the switch 43 OFF (open state) cuts off a supply of the electric power supply voltage from the power supply unit 20 to image reading unit 23. The image reading unit 23 is thus in the sleep state, which is a state in which no power supply voltage is supplied. Turning the switch 43 ON (closed state) supplies a power supply voltage from the power supply unit 20 to the image reading unit 23. The image reading unit 23 is thus woken up.

Similarly, turning the switches 44, 45, and 46 OFF cuts off the supply of the electric power supply voltage from the power supply unit 20 to the image forming unit 24, the image memory 25, and the facsimile communication unit 26. The image forming unit 24, the image memory 25, and the facsimile communication unit 26 is thus in the sleep state. Turning the switches 44, 45, and 46 ON supplies a power supply voltage from the power supply unit 20 to the image forming unit 24, the image memory 25, and the facsimile communication unit 26. The image forming unit 24, the image memory 25, and the facsimile communication unit 26 are thus woken up.

Note that the operation unit 21, the communication control unit 22, and the main control unit 10 are supplied with a power supply voltage from the power supply unit 20 without the switches being interposed.

The operation unit 21 includes a display unit 211 for displaying information and an operation key portion 212 for allowing a user to operate various instructions. The display unit 211 is, for example, a liquid crystal display, such as a touch panel function and displays various kinds of information. The operation key portion 212 includes various keys, including a start key for entering an instruction for executing various functions, such as facsimile communication, and a numeric keypad.

The communication control unit 22 is connected to the network 3, and sends and receives various data with an external device, such as a personal computer connected to the network 3, according to a communication standard such as 100/1000 Base-T. The communication control unit 22 sends and receives e-mails, data indicating a print instruction including print target data and an execution instruction for a printing function, or scan image data with an external device via the network 3.

The image reading unit 23 includes an optical system unit (not shown). The optical system unit has a CCD (Charge Coupled Device) line sensor, an exposing lamp or the like arranged movably at a position facing a top surface of an apparatus main body (not shown) along the top surface. The optical system unit is configured to be moved by the driving unit (not shown). The image reading unit 23 moves the optical system unit at the position facing the top surface of the apparatus main body along the top surface. Then the image reading unit 23 outputs image data, which has been obtained by causing the optical system unit to scan an image of an original document placed on the top surface, to the main control unit 10.

The image forming unit 24 forms an image on a paper sheet based on image data received from another multi-functional peripheral 1 via the network 3 or image data stored in the image memory 25 described below. More specifically, the image forming unit 24 has a known configuration including a photoreceptor drum, a charging unit, an exposure unit, a developing unit, a cleaning unit and the like. The charging unit is arranged facing a circumference surface of the photoreceptor drum. The exposing unit is arranged facing the circumference surface of the photoreceptor drum where the surface is downstream of the charging unit. The developing unit is arranged facing the circumference surface of the photoreceptor drum where the surface is downstream of the exposing unit. The cleaning unit is arranged facing the circumference surface of the photoreceptor drum where the surface is downstream of the developing unit.

The image memory 25 is made up of a non-volatile memory such as a flash memory. The image memory 25 stores image data read by the image reading unit 23. The image memory 25 also stores image data received from another multi-functional peripheral 1 via the network 3.

The facsimile communication unit 26 is connected to the network 3. The facsimile communication unit 26 conducts facsimile communication of sending and receiving image data with another multi-functional peripheral 1 following a procedure compliant to ITU-T recommendations T.38 or T.30 via the network 3.

The main control unit 10 includes, for example, a CPU (Central Processing Unit) (not shown) for executing a predetermined arithmetic operation, a non-volatile memory (not shown) such as an EEPROM (Electrically Erasable and Programmable Read. Only Memory) storing a predetermined control program, a RAM (Random Access Memory) (not shown) for temporarily storing data, and a peripheral circuit of these elements. The main control unit 10 controls each operating unit by causing the CPU to run the control program stored in the non-volatile memory or a similar memory.

The main control unit 10 operates as an energy-saving control unit 11, a function execution unit 12, an execution instruction transmitter 13, a selection instruction transmitter 14, an instruction receiver 16, and a wake-up unit 17. The main control unit 10 uses part of a storage region of the non-volatile memory as a functional information storage unit 15.

The energy-saving control unit 11 alternatively runs a normal mode and an energy saving mode. The normal mode supplies a power supply voltage from the power supply unit 20 to each operating unit 21-26 and the main control unit 10. The energy saving mode supplies a power supply voltage from the power supply unit 20 to the operation unit 21, the communication control unit 22, and the main control unit 10 and suspends the other operating units 23-26.

The energy-saving control unit 11 runs the normal mode when the multi-functional peripheral 1 initially operates or when a function execution instruction is entered via the operation unit 21. The energy-saving control unit 11 turns the switches 43-46 ON upon starting the normal mode, thus supplying a power supply voltage from the power supply unit 20 to individual operation units 21-26, and the main control unit 10.

During the normal mode operation, the energy-saving control unit 11 runs the energy saving mode instead of the normal mode if no function execution instruction is entered via the operation unit 21 within a predetermined time limit. In addition, a power-saving key for entering an instruction for causing the energy-saving control unit 11 to run the energy saving mode may be provided at the operation key portion 212. Accordingly, the energy-saving control unit 11 may be ensured to run the energy saving mode instead of the normal mode when the power-saving key is pressed.

The energy-saving control unit 11 turns the switches 43-46 OFF upon starting the energy saving mode, thus cutting off the supply of the electric power supply voltage from the power supply unit 20 to the image reading unit 23, the image forming unit 24, the image memory 25, and the facsimile communication unit 26. As a result, the image reading unit 23, the image forming unit 24, the image memory 25, the facsimile communication unit 26 is in the sleep state, at which state no power supply voltage is supplied.

The function execution unit 12 accepts a function execution instruction entered by a user via the operation unit 21 or a function execution instruction transmitted from an external device via the network 3. The function execution unit 12 then runs the function instructed by the accepted execution instruction.

The function execution unit 12 can run, for example, a scan function and a copying function the scan function is a function for causing the image reading unit 23 to obtain image data representing an image of an original document before storing the obtained image data in the image memory 25. The copy function is a function to cause the image reading unit 23 to obtain image data representing an image of an original document before causing the image forming unit 24 to form the image represented by the obtained image data on a paper sheet.

In addition, the function execution unit 12 can run a facsimile transmission function, a relay transmission function, a confidential reception function, and a facsimile reception function as a function related to facsimile communication executed by the facsimile communication unit 26.

The facsimile transmission function is a function for transmitting image data to another multi-functional peripheral 1 or a facsimile device through facsimile communication executed by the facsimile communication unit 26. The relay transmission function is a function for receiving image data transmitted by another multi-functional peripheral 1 or facsimile device through facsimile communication executed by the facsimile communication unit 26 before forwarding the received image data to yet another multi-functional peripheral 1 or facsimile device.

The confidential reception function is a function for receiving image data transmitted by another multi-functional peripheral 1 or facsimile device through facsimile communication executed by the facsimile communication unit 26 before storing the received image data in a predetermined storage region for a confidential image data in the image memory 25. The facsimile reception function is a function for receiving image data transmitted by another multi-functional peripheral 1 or facsimile device through facsimile communication executed by the facsimile communication unit 26 before causing the image forming unit 24 to form the image represented by the received image data on a paper sheet.

The execution instruction transmitter 13 accepts an instruction for selecting a function to be run by the function execution unit 12 of another multi-functional peripheral 1 connected to the network 3. The execution instruction transmitter 13 also accepts an entry of target data to be processed by the function. The execution instruction transmitter 13 then transmits the function execution instruction instructed by the accepted selection instruction and the target data to the other multi-functional peripheral 1.

For example, the execution instruction transmitter 13 selectably displays a list of destinations of another multi-functional peripheral 1 connected to the network 3 (for example, IP addresses or telephone numbers) on the display unit 211. One of the selectably displayed destinations on the display unit 211 is then selected by the user via the operation unit 21. The execution instruction transmitter 13 stores the selected destination selected by the user in a RAM or a similar memory. The execution instruction transmitter 13 then selectably displays on the display unit 211 a list of functions executable at the function execution unit 12 of another multi-functional peripheral 1 corresponding to the destinations stored in the RAM or a similar memory. The execution instruction transmitter 13 then accepts an instruction for selecting the function when any of the selectably displayed functions on the display unit 211 is selected by the user via the operation unit 21.

After accepting the instruction for selecting the function, the execution instruction transmitter 13 accepts an entry of target data to be processed by the function. For example, if the execution instruction transmitter 13 accepts an instruction for selecting a function related to facsimile communication as an instruction for selecting the function to be run by function execution unit 12 of another multi-functional peripheral 1, it accepts an entry of image data as target data to be processed by the function instructed by the selection instruction as follows.

The execution instruction transmitter 13 selectably displays, on the display unit 211, a first button and a second button. The first button is a button for entering an instruction for causing the image reading unit 23 to obtain image data representing an image of an original document. The second button is a button for entering an instruction for reading the image data stored in the image memory 25. Now assume the first button is then selected by the user via the operation unit 21. In this case, the execution instruction transmitter 13 will cause the image reading unit 23 to obtain the image data representing the image of the original document and accepts the obtained image data as target data.

On the other hand, assume the second button is selected by the user via the operation unit 21. In this case, the execution instruction transmitter 13 selectably will display, on the display unit 211, identification information of the image data stored in the image memory 25. Then any of the selectably displayed identification information on the display unit 211 will be selected by the user via the operation unit 21. At that time, the execution instruction transmitter 13 will read the image data corresponding to the selected identification information from the image memory 25 and accept the read image data as target data.

If the execution instruction transmitter 13 accepts a instruction for selecting a relay transmission function as a instruction for selecting the function to be run by the function execution unit 12 of another multi-functional peripheral 1, it further accepts an entry of a destination of the multi-functional peripheral 1 or facsimile device to which the instruction is forwarded as target data. For example, the execution instruction transmitter 13 prompts the user to enter a destination of the multi-functional peripheral 1 or facsimile device to which the instruction is forwarded. When a destination of the multi-functional peripheral 1 or facsimile device to which the instruction is forwarded is entered by the user via the operation unit 21, the execution instruction transmitter 13 accepts the entered destination as target data to be processed by the relay transmission function.

Then the execution instruction transmitter 13 uses the communication control unit 22 to transmit the instruction for running the function and the accepted target data to the another multi-functional peripheral 1 corresponding to the destination stored in RAM or a similar memory to cause the function execution unit 12 of another multi-functional peripheral 1 to run the function instructed by the instruction for selecting the accepted function. If the function instructed by the instruction for selecting the accepted function is related to facsimile communication, the execution instruction transmitter 13 transmits image data included in the accepted target data to the another multi-functional peripheral 1 through facsimile communication executed by the facsimile communication unit 26.

Now assume that an instruction for selecting the facsimile transmission function is entered via the operation unit 21 as a function for causing the function execution unit 12 of the multi-functional peripheral 1 including the operation unit 21 to execute. The image data will be transmitted to another multi-functional peripheral 1 connected to the network 3. In this case, the function execution unit 12 of the another multi-functional peripheral 1 to which the image data will be transmitted will execute the facsimile reception function. If the instruction for selecting the facsimile transmission function, that is, the image data will be transmitted to another multi-functional peripheral connected to the network 3, is entered, the execution instruction transmitter 13 will accept an instruction for selecting the facsimile reception function as a instruction for selecting a function causing the function execution unit 12 of the another multi-functional peripheral 1 to execute. In this case, the execution instruction transmitter 13 accepts the entry of target data to be processed by facsimile reception function, as described above.

Based on the information stored in a later described functional information storage unit 15, the selection instruction transmitter 14 selects an operating unit required to operate at the time of running the function instructed by the selection instruction accepted by the execution instruction transmitter 13 as the operating unit for processing the target data accepted by the execution instruction transmitter 13. The selection instruction transmitter 14 uses the communication control unit 22 to transmit the instruction for selecting the operating unit that processes the target data to another multi-functional peripheral 1 to which the execution instruction and target data are transmitted before the execution instruction transmitter 13 transmits the execution instruction and the target data.

Stored in the functional information storage unit 15 is information that maps a function executable for the function execution unit 12 of another multi-functional peripheral 1 to an operating unit required to operate at the time of running the function.

FIG. 3 illustrates exemplary information stored in a functional information storage unit 15. As illustrated in FIG. 3, the facsimile communication unit 26 is mapped to the relay transmission function as the operating unit required to operate at the time of running the relay transmission function. The facsimile communication unit 26 and the image memory 25 are mapped to the confidential reception function as an operating unit required to operate at the time of running the confidential reception function. The facsimile communication unit 26 and the image forming unit 24 are mapped to the facsimile reception function as an operating unit required to operate at the time of running the facsimile reception function.

Assume, for example, that an instruction for selecting the relay transmission function is accepted by the execution instruction transmitter 13. In this case, the selection instruction transmitter 14 will select the facsimile communication unit 26 required to operate at the time of running the relay transmission function as an operating unit for processing the target data, based on the information stored in the functional information storage unit 15.

Please also assume that an instruction for selecting the confidential reception function is accepted by the execution instruction transmitter 13. In this case, the selection instruction transmitter 14 will select the facsimile communication unit 26 and the image memory 25 required to operate at the time of running the confidential reception function as an operating unit for processing the target data, based on the information stored in the functional information storage unit 15.

Now let us also assume that an instruction for selecting the facsimile reception function is accepted by the execution instruction transmitter 13. In this case, the selection instruction transmitter 14 will select, as an operating unit for processing the target data, the facsimile communication unit 26 and the image forming unit 24 that are required to operate at the time of running the facsimile reception function, based on the information stored in the functional information storage unit 15.

The instruction receiver 16 uses the communication control unit 22 to receive the instruction for selecting the operating unit that processes the target data transmitted by selection instruction transmitter 14 from the transmission-side multi-functional peripheral 1 connected via the network 3 prior to the transmission of the execution instruction and the target data by the execution instruction transmitter 13.

When an instruction for selecting the operating unit that processes the target data is received by the instruction receiver 16 during the energy saving mode by the energy-saving control unit 11, the wake-up unit 17 powers the operating unit to wake up from the sleep state if the operating unit instructed by the selection instruction is in the sleep state.

However, the wake-up unit 17 will not run the wake-up process if the time of instruction receiver 16 receiving the selection instruction falls within a period during which the operating unit instructed by the selection instruction is inhibited from being woken up. If the wake-up unit 17 does not run the wake-up process, the wake-up unit 17 uses the communication control unit 22 to reply communication information indicating a time at which the operating unit instructed by the selection instruction can be woken up to the multi-functional peripheral 1 from which the selection instruction was transmitted.

Figure 4:
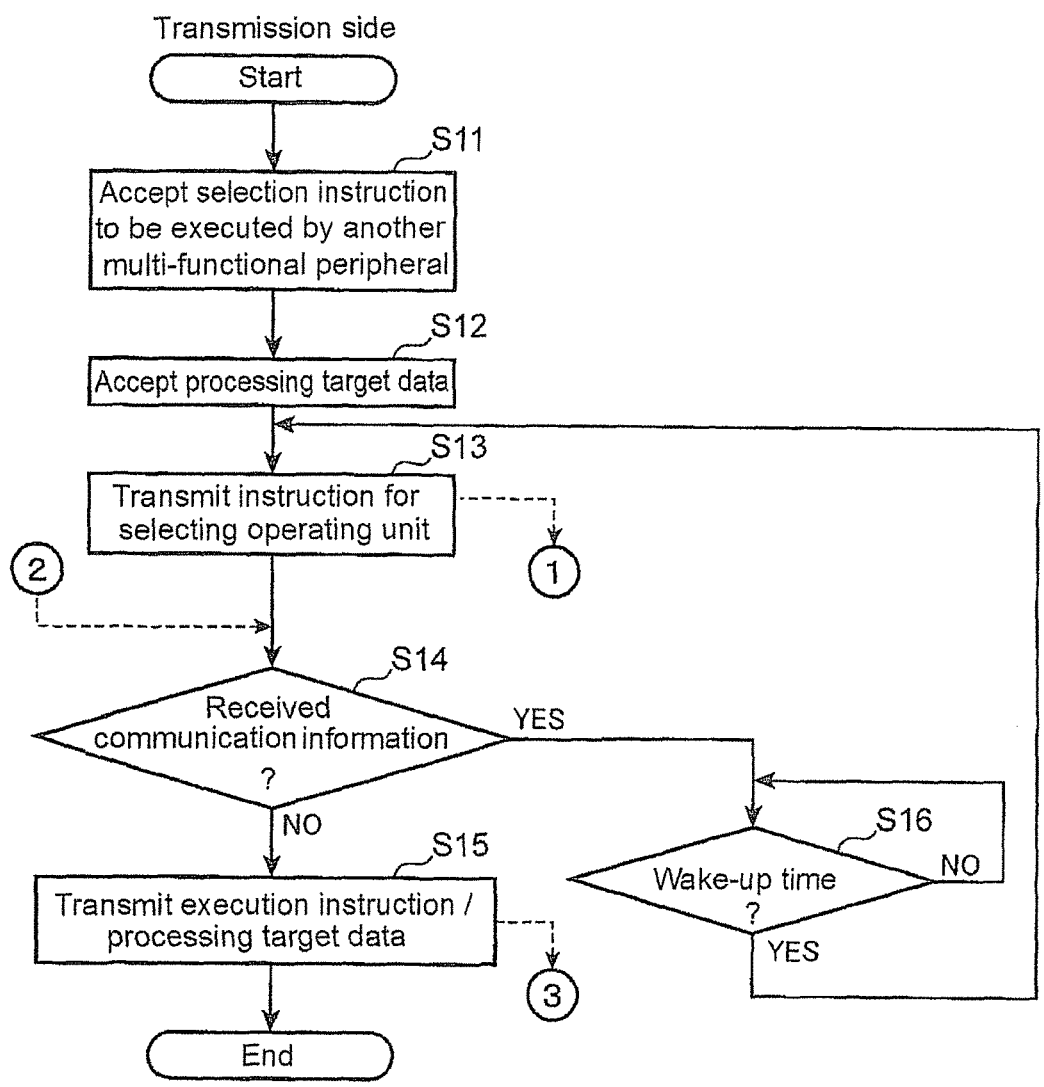
FIG. 4 illustrates an operation of a transmission-side multi-functional peripheral at the time of causing a function execution unit of another multi-functional peripheral to execute a function according to the one embodiment.
Figure 5:
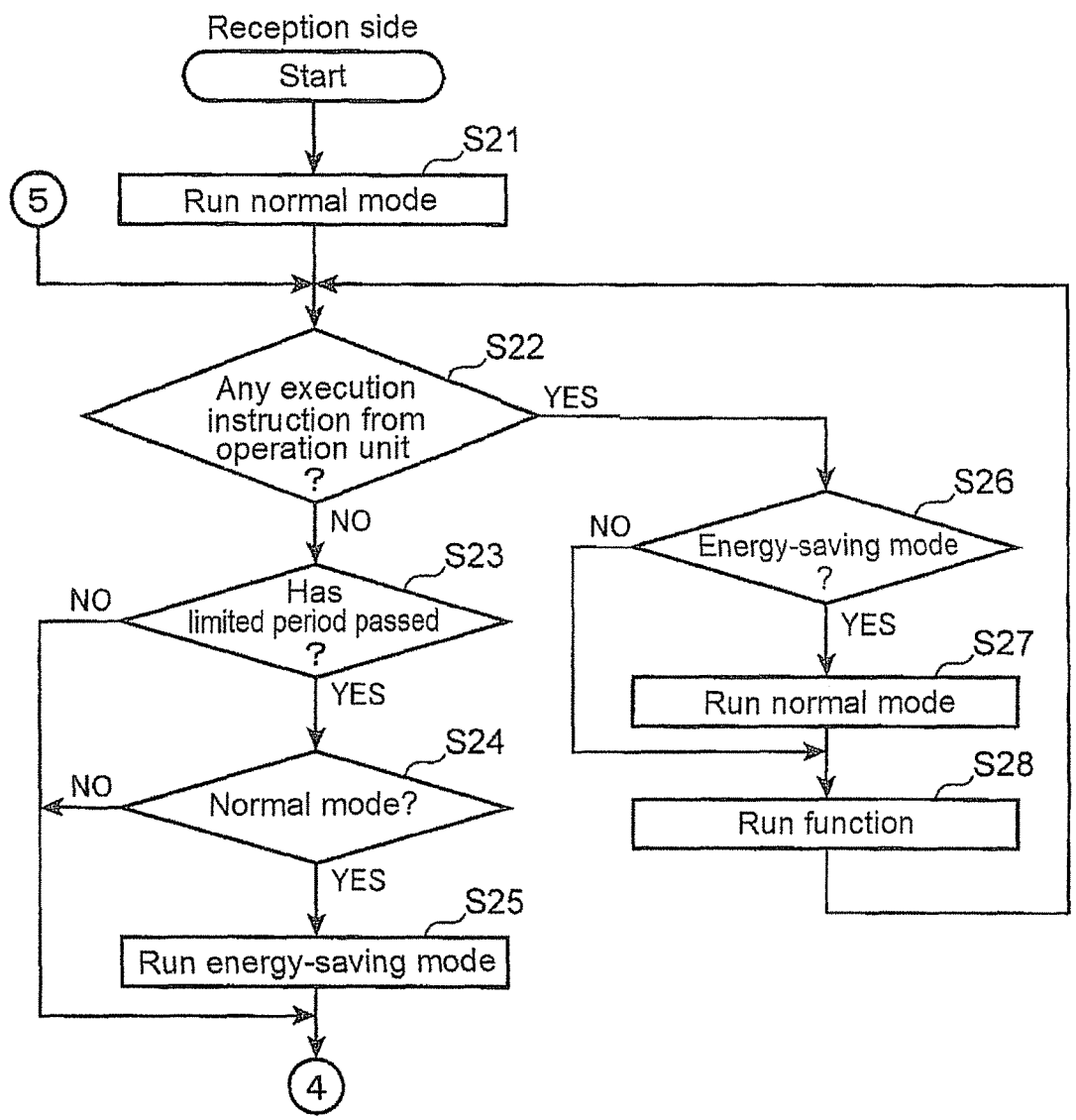
FIG. 5 illustrates an operation of an energy-saving control unit alternatively running a normal mode or an energy saving mode in a reception-side multi-functional peripheral according to the one embodiment.
Figure 6:
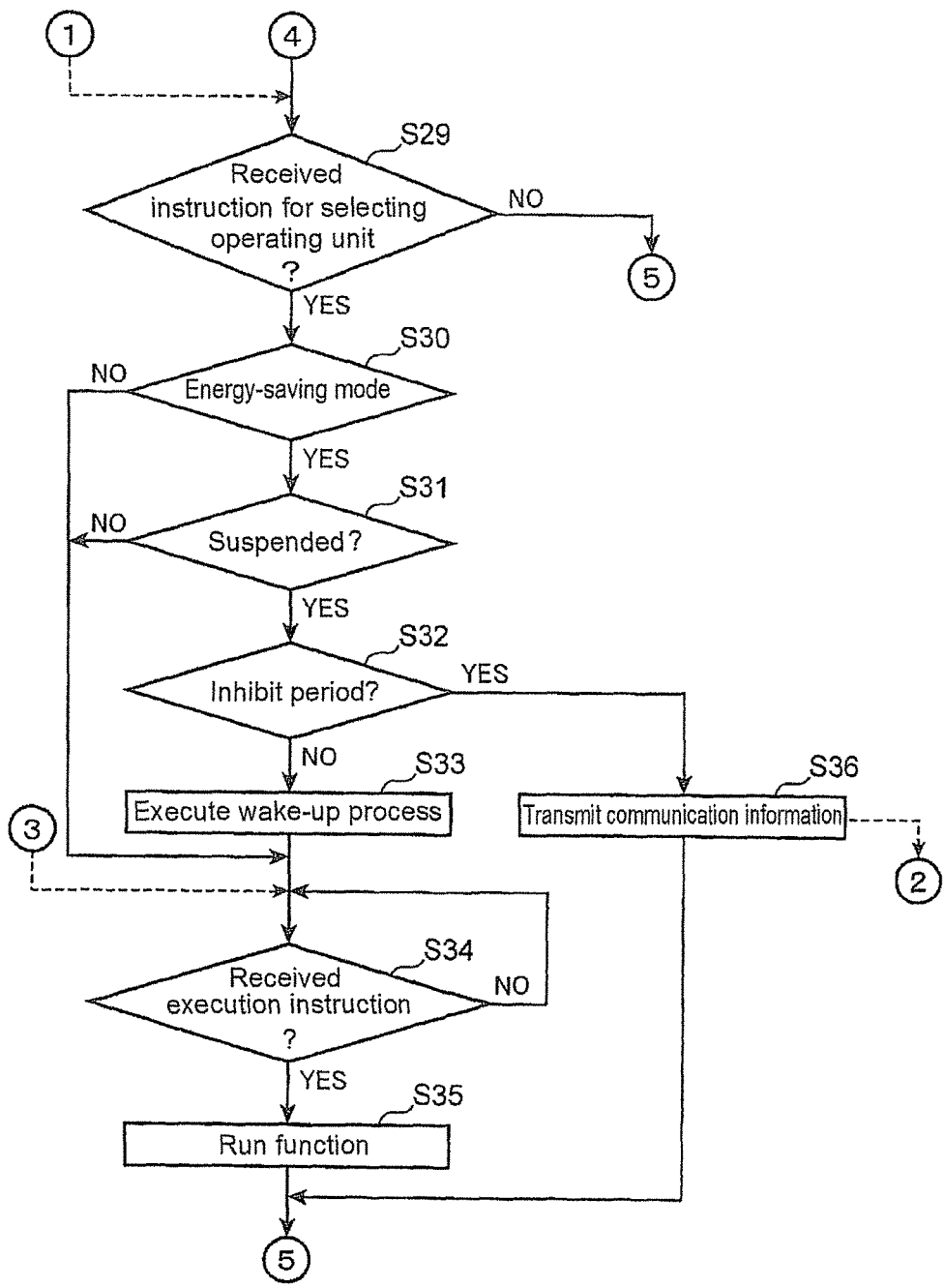
FIG. 6 illustrates an operation of a function execution unit at the time of running a function in a reception-side multi-functional peripheral according to the one embodiment.

Described-below is how the multi-functional peripheral 1a (FIG. 1) operates when it causes the function execution unit 12 of the another multi-functional peripheral 1c (FIG. 1) to run a function. FIG. 4 illustrates an operation of a transmission-side multi-functional peripheral 1a at the time of causing the function execution unit 12 of another multi-functional peripheral 1c to execute a function. FIG. 5 illustrates an operation of the energy-saving control unit 11 alternatively running a normal mode or an energy saving mode in a reception-side multi-functional peripheral 1c. FIG. 6 illustrates an operation of the function execution unit 12 running a function in a reception-side multi-functional peripheral 1c.

As illustrated in FIG. 4, in the transmission-side multi-functional peripheral 1a (transmission-side device), the execution instruction transmitter 13 accepts an instruction for selecting a function that causes the function execution unit 12 of another multi-functional peripheral 1c to run (S11). In step S11, the execution instruction transmitter 13 stores a destination of another multi-functional peripheral 1c in a RAM or a similar memory as described above. The following describes a case where the execution instruction transmitter 13 accepts an instruction for selecting the confidential reception function as an example in step S11.

Next, the execution instruction transmitter 13 accepts an entry of target data to be processed by the confidential reception function instructed by the selection instruction accepted in step S11 (S12).

After the execution instruction transmitter 13 accepts the instruction for selecting the confidential reception function and the entry of the target data, the selection instruction transmitter 14 selects, as an operating unit for processing the target data, the facsimile communication unit 26 and the image memory 25 that are required to operate at the time of running the confidential reception function, based on information stored in a functional information storage unit 15 (FIG. 3). Then the selection instruction transmitter 14 uses the communication control unit 22 to transmit an instruction for selecting the facsimile communication unit 26 and the image memory 25 to another multi-functional peripheral 1c corresponding to the destination stored in a RAM or a similar memory (S13).

On the other hand, in the reception-side multi-functional peripheral 1c, which is the another multi-functional peripheral 1c (reception-side device), the energy-saving control unit 11 runs the normal mode at the time of an initial operation of the multi-functional peripheral 1c, as illustrated in FIG. 5 (S21). This will supply power supply voltage from the power supply unit 20 to each operating unit 21-26, and the main control unit 10 (FIG. 2).

Now assume that a predetermined time limit has passed (Yes in S23) with no instruction for running a function being entered via the operation unit 21 (No in S22). In this case, the energy-saving control unit 11 will run the energy saving mode instead of the normal mode (S25) if it is running the normal mode (Yes in S24). The energy-saving control unit 11 will turn the switches 43-46 OFF upon starting the energy saving mode, thus cutting off the supply of the electric power supply voltage from the power supply unit 20 to each of the operating units 23-26. This means that the image reading unit 23, the image forming unit 24, the image memory 25, and the facsimile communication unit 26 will be in the sleep state.

If no instruction for running a function is entered via the operation unit 21 (No in S22) and a predetermined time limit has not passed (No in S23), and if the energy-saving control unit 11 is running the energy saving mode (No in S24), the energy-saving control unit 11 will not turn the switches 43-46 ON or OFF and continue to run the normal mode or energy saving mode.

On the other hand, in a case where an instruction for running a function is entered via the operation unit 21 (Yes in S22), the energy-saving control unit 11 will run the normal mode instead of the energy saving mode (S27) if it is running the energy saving mode (Yes in S26). The energy-saving control unit 11 turns the switches 43-46 ON upon starting the normal mode. This supplies power supply voltage from the power supply unit 20 to each of the operating units 23-26, and collectively wakes up the image reading unit 23, the image forming unit 24, the image memory 25, and the facsimile communication unit 26. The energy-saving control unit 11 continues to run the normal mode with the switches 43-46 being ON if the energy-saving control unit 11 has already run the normal mode (No in S26).

When the energy-saving control unit 11 runs the normal mode (No in S26 or S27), the function execution unit 12 executes a function according to the execution instruction entered in step S22 (S28). After step S28, step 22 is repeated.

As illustrated in FIG. 6, step S22 is also repeated if the instruction for selecting the operating unit for processing the target data transmitted from the transmission-side multi-functional peripheral 1a is not received by the instruction receiver 16 (No in S29).

When the instruction receiver 16 receives the instruction for selecting the operating unit for processing the target data transmitted from the transmission-side multi-functional peripheral 1a, that is, the instruction for selecting the facsimile communication unit 26 and the image memory 25 (Yes in S29), the wake-up unit 17 determines whether or not the energy-saving control unit 11 is running the energy saving mode (S30).

If the wake-up unit 17 determines that the energy-saving control unit 11 is running the energy saving mode (Yes in S30), it then will determine whether or not at least one of the facsimile communication unit 26 and the image memory 25 instructed by selection instruction received in step S29 is in the sleep state (S31).

If the wake-up unit 17 determines that the operating unit of at least one of the facsimile communication unit 26 and the image memory 25 is in the sleep state (Yes in S31), it will determine whether or not the time when the instruction receiver 16 receives the instruction for selecting the facsimile communication unit 26 and the image memory 25 falls within a predetermined reception inhibit period, a period during which the suspended operating unit cannot be operated (S32).

If the wake-up unit 17 determines that the time when it receives the selection instruction in step S29 does not fall within the reception inhibit period (NO at S32), it will wake up (S33). This means that the wake-up unit 17 turns the switch corresponding to the suspended operating unit ON, out of the switches 46 and 45, respectively connected to the facsimile communication unit 26 and the image memory 25. Accordingly, the wake-up unit 17 supplies a power supply voltage from the power supply unit 20 to the suspended one of the operating units of the facsimile communication unit 26 and the image memory 25, and wakes up the suspended operating unit from the sleep state.

If the wake-up unit 17 determines that the time when it receives the selection instruction in step S29 falls within the reception inhibit period (Yes in S32), on the other hand, it uses the communication control unit 22 to reply communication information indicating a time at which the suspended operating unit, out of the facsimile communication unit 26 and the image memory 25, can be woken up to the multi-functional peripheral 1a from which the selection instruction received in step S29 was transmitted (S36). In step S36, the wake-up unit 17 sets the wake-up time to a time that is later by a predetermined period (for example, five minutes) from the end time of the aforementioned inhibit period. After step S36, step S22 (FIG. 5) is repeated.

Now assume that, in the transmission-side multi-functional peripheral 1a, as illustrated in FIG. 4, the communication control unit 22 did not receive communication information replied from the multi-functional peripheral 1c within the predetermined period (No in S14) after the wake-up unit 17 transmitted the instruction for selecting the facsimile communication unit 26 and the image memory 25 to the multi-functional peripheral 1c in step S13. In this case, the facsimile communication unit 26 and the image memory 25 instructed by the aforementioned selection instruction is considered to have been woken up in the reception-side multi-functional peripheral 1c. The execution instruction transmitter 13 then uses the communication control unit 22 to transmit the instruction for running the confidential reception function, which is the function instructed by the selection instruction accepted in step S11, to the multi-functional peripheral 1c and to cause the facsimile communication unit 26 to transmit the target data accepted in step S12 to the multi-functional peripheral 1c through facsimile communication (S15).

Now assume that, after transmitting the instruction for selecting the facsimile communication unit 26 and the image memory 25 to the multi-functional peripheral 1c in step S13, the communication control unit 22 have received the communication information replied from the multi-functional peripheral 1c within the predetermined period (Yes in S14). In this case, the selection instruction transmitter 14 waits until the wake-up time indicated by the received communication information (No in S16), and does step S13 again when the wake-up time has been reached (Yes in S16). This means that the selection instruction transmitter 14 transmits the instruction for selecting the facsimile communication unit 26 and the image memory 25 again at the wake-up time indicated by the communication information.

In the reception-side multi-functional peripheral 1c, on the other hand, if the wake-up unit 17 determines that the energy saving mode is not being run in step S30 (No in S30), if the wake-up unit 17 determines that either of the facsimile communication unit 26 and the image memory 25 is not suspended (No in S31) in step S31, and if the wake-up unit 17 has run a wake-up process (S33), as illustrated in FIG. 6, the facsimile communication unit 26 and the image memory 25 are both awake. In this case, the function execution unit 12 waits until an instruction for running the confidential reception function transmitted from the transmission-side multi-functional peripheral 1e is received by the communication control unit 22 (No in S34).

If the communication control unit 22 receives the instruction for running the confidential reception function transmitted from the transmission-side multi-functional peripheral 1a (Yes in S34), the function execution unit 12 runs the confidential reception function instructed by the received instruction (S35). This means that the function execution unit 12 stores the received target data in a storage region for predetermined confidential data in the image memory 25 after causing the communication control unit 22 to receive the target data transmitted from the transmission-side multi-functional peripheral 1a through facsimile communication executed by the facsimile communication unit 26. After step S35, step S22 is repeated.

According to the configuration of the first embodiment, the instruction receiver 16 receives an instruction for selecting an operating unit for target data transmitted the transmission-side multi-functional peripheral 1a prior to the transmission of the target data. In a case where the instruction receiver 16 receives a selection instruction during the energy saving mode, the wake-up unit 17 will wake up the operating unit instructed by the selection instruction if it is in the sleep state. This will power the operating unit to wake it up. As a result, the operating unit that processes the target data will have been already awake when it receives afterwards the target data transmitted by the transmission-side multi-functional peripheral 1a. Hence the communication device can cause the operating unit to quickly process the target data after receiving it.

In addition, there is no need to assign a plurality of destinations, such as an IP address to be used for communication with the multi-functional peripheral 1c, to the reception-side multi-functional peripheral 1c. This means that the reception-side multi-functional peripheral 1c is more practical in that IP addresses to be assigned are less apt to be exhausted, compared with the conventional MFP.

In addition, the wake-up unit 17 will not run a wake-up process if the time when the instruction receiver 16 receives the selection instruction falls within a period during which the operating unit instructed by the selection instruction is inhibited from being woken up. As a result, the selection instruction is received by the instruction receiver 16 during the inhibit period at the reception-side multi-functional peripheral 1c. Accordingly, the operating unit by the selection instruction is less apt to be woken up.

In addition, if the wake-up unit 17 does not a wake-up process, it will reply the communication information, which indicates a time at which the operating unit instructed by the selection instruction can be woken up, received by the instruction receiver 16 to the multi-functional peripheral 1a from which the selection instruction was transmitted. The multi-functional peripheral 1a that transmitted the selection instruction can be hence aware that the operating unit instructed by the selection instruction cannot be woken up until the wake-up time indicated by the received communication information if it receives the communication information replied from the multi-functional peripheral 1c to which it transmitted the selection instruction. As a result, the multi-functional peripheral 1a that transmitted the selection instruction can avoid unnecessarily transmitting target data when it cannot process the target data.

In the transmission-side multi-functional peripheral 1a, the selection instruction transmitter 14 selects the operating unit required to operate at the time of running the function indicated by the execution instruction transmitted by the execution instruction transmitter 13 as an operating unit for processing the target data, based on the information stored in a functional information storage unit 15 (FIG. 3). The selection instruction transmitter 14 transmits the instruction for selecting the operating unit that processes the target data to another multi-functional peripheral 1c before the transmission of execution instruction and the target data by the execution instruction transmitter 13. In the reception-side multi-functional peripheral 1c, if the operating unit specified by the selection instruction received during the energy saving mode is in the sleep state, the operating unit will be woken up.

As a result, when the reception-side multi-functional peripheral 1c receives the instruction for running a function for processing the target data transmitted from the transmission-side multi-functional peripheral 1a and the target data later, the operating unit that processes the target data will have been woken up. This means that the operating unit required to operate at the time of running the function instructed by the received execution instruction will have been awake. This enables the function execution unit 12 to quickly run the function instructed by the execution instruction in the reception-side multi-functional peripheral 1c after receiving the instruction for running the function.

In addition, in the transmission-side multi-functional peripheral 1a, the selection instruction transmitter 14 transmits the selection instruction again to the another multi-functional peripheral 1c to which the image data will be transmitted at or after the wake-up time indicated by the communication information if it receives the communication information replied from another multi-functional peripheral 1c after transmitting the selection instruction. As a result, the reception-side multi-functional peripheral 1c will receive the selection instruction transmitted again after the wake-up time. This will enable the reception-side multi-functional peripheral 1c to wake up the operating unit instructed by the selection instruction transmitted again.

Please note that the configurations or a similar element of the first embodiment as illustrated in FIG. 1 to FIG. 6 are merely exemplary embodiments according to the disclosure and not intended to limit the disclosure to the first embodiment.

For example, in the aforementioned first embodiment, the wake-up unit 17 may reply communication information indicating that the operating unit instructed by the selection instruction cannot be woken up in step S36, instead of replying the communication information received by the instruction receiver 16, indicating a time at which the operating unit instructed by the selection instruction can be woken up, to the source from which the selection instruction was transmitted. The multi-functional peripheral 1, which transmitted the selection instruction, may accordingly display a warning that the operating unit instructed by the selection instruction cannot be woken up, such as by displaying the communication information on the display unit 211 in step S14, if it receives communication information indicating that the operating unit instructed by the selection instruction cannot be woken up. The multi-functional peripheral 1 may then terminate its operation without doing step S15.

In addition, in the aforementioned first embodiment, the wake-up unit 17 may be simplified not to do step S32. This means that, if the operating unit instructed by the selection instruction received by the instruction receiver 16 is in the sleep state, the wake-up unit 17 may always run a wake up process regardless of the time when the instruction receiver 16 receives the selection instruction.

Second Embodiment

In the second embodiment, the wake-up unit 17 is characterized by not waking up the operating unit indicated by the first selection instruction if it is in the sleep state in a case where the instruction receiver 16 receives a first selection instruction within an energy-saving priority period. The energy-saving priority period is a period during which the energy-saving control unit 11 preferentially runs the energy saving mode. This means that, during the energy-saving priority period, it is preferred to suspend the image reading unit 23, the image forming unit 24, the image memory 25, and the facsimile communication unit 26. Unlike the reception inhibit period described in the aforementioned first embodiment, however, the image reading unit 23, the image forming unit 24, the image memory 25, and the facsimile communication unit 26 can be temporarily woken up during the energy-saving priority period, as described below.

The wake-up unit 17 is characterized by determining a first wake-up time for the operating unit indicated by the first selection instruction to be woken up to a time later than the reception time within the energy-saving priority period indicated by the first selection instruction, and replying a first communication information indicating the determined first wake-up time to the source from which the first selection instruction was transmitted.

Further, in the second embodiment, the wake-up unit 17 is characterized in not waking up the operating unit indicated by a second selection instruction if it is in the sleep state, in a case where the instruction receiver 16 receives the second selection instruction within a reservation acceptance period. The reservation acceptance period is a period from a time when the instruction receiver 16 receives the first selection instruction until a first wake-up time. The wake-up unit 17 is also is characterized by determining a second wake-up time, when the operating unit instructed by the second selection instruction can be woken up, to a time later than the first wake-up time by a predetermined waiting period, and replies second communication information indicating the determined second wake-up time to the source from which the second selection instruction was transmitted.

Again in the second embodiment, the wake-up unit 17 is characterized by keeping the operating unit woken up through a wake-up process awake during a period from the aforementioned first wake-up time until wake-up priority period. The wake-up priority period is represented by a product of the number of times for instruction receiver 16 to receive a selection instruction within the aforementioned reservation acceptance period and the waiting period of instruction receiver 16.

Figure 7:
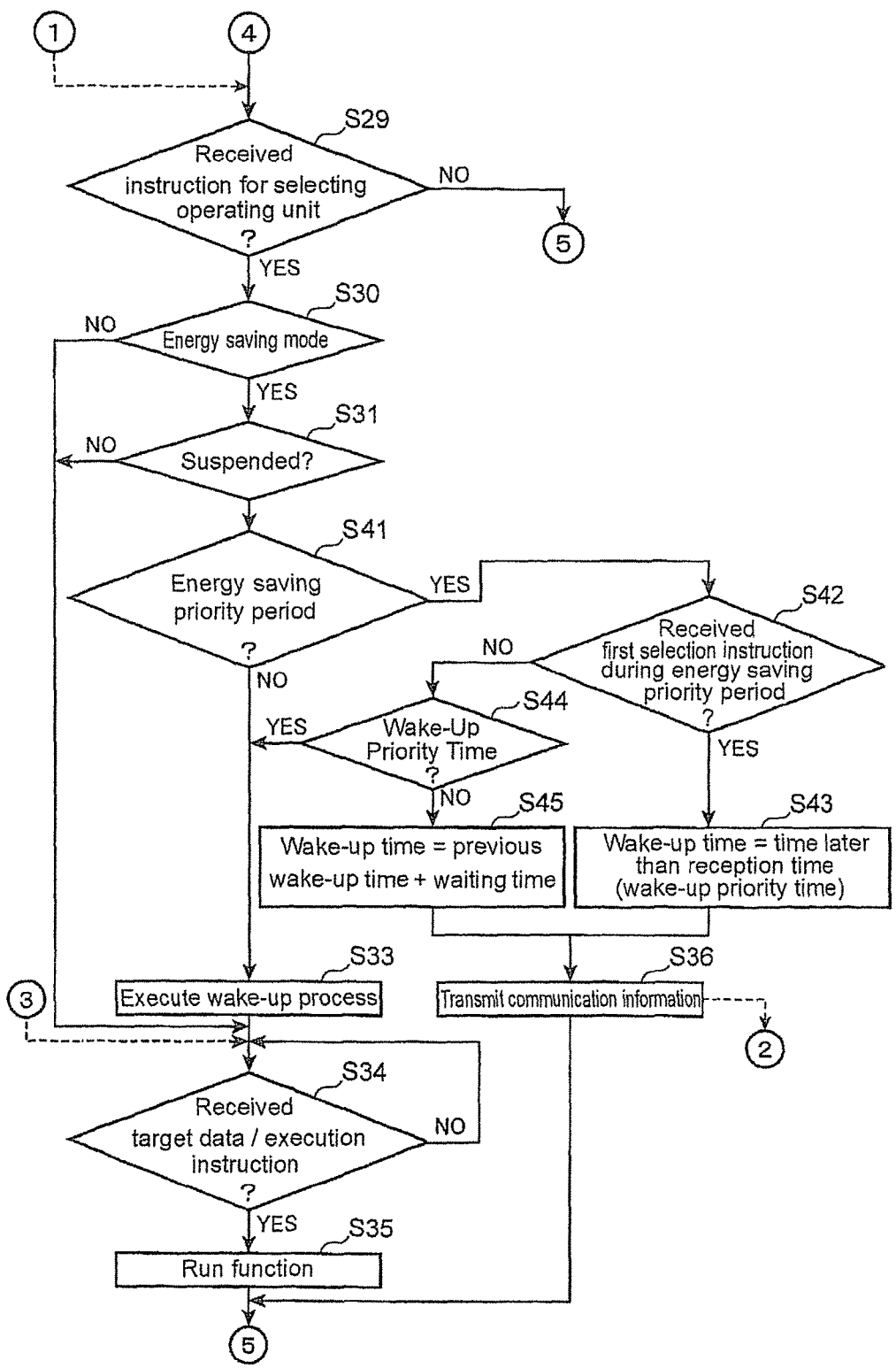
FIG. 7 illustrates an operation of a function execution unit at the time of running a function in a reception-side multi-functional peripheral according to another embodiment.

The following describes how to cause the function execution unit 12 of the multi-functional peripheral 1c (FIG. 1) to run a function from each of two multi-functional peripherals 1a and 1b (FIG. 1) in the second embodiment, with reference to FIGS. 4 and 5, which were used to describe the first embodiment and with a use of FIG. 7 instead of FIG. 6, which was used to describe the first embodiment. FIG. 7 illustrates an operation of the function execution unit 12 running a function in a reception-side multi-functional peripheral 1c according to the second embodiment.

Please note that, in the following descriptions, similar reference numerals are given to elements similar to those in the first embodiment and descriptions on the elements are omitted unless otherwise stated. In addition, the following describes a case where an instruction for selecting a relay transmission function is accepted in the multi-functional peripheral 1a in step S11 (FIG. 4) before an instruction for selecting the confidential reception function is accepted in the multi-functional peripheral 1b in step S11, as an example.

In the transmission-side multi-functional peripheral 1a, the steps S12 to S13 are executed after the instruction for selecting the relay transmission function is accepted in step S11 (FIG. 4). As a result, an instruction for selecting the facsimile communication unit 26, which is an operating unit required at the time of running the relay transmission function (FIG. 3), is transmitted to the multi-functional peripheral 1c.

In the reception-side multi-functional peripheral 1c, on the other hand, the selection instruction, transmitted from the multi-functional peripheral 1a, of the facsimile communication unit 26 is received by the instruction receiver 16, as illustrated in FIG. 7 (Yes in S29). The following descriptions assume that the selection instruction, transmitted from the multi-functional peripheral 1a, of the facsimile communication unit 26 was received at 22:30, as an example. The following description also assumes that the energy-saving control unit 11 ran the energy saving mode at 22:00, and the instruction receiver 16 received no selection instruction afterwards until 22:30.

In this case, the wake-up unit 17 determines that the energy-saving control unit 11 is running the energy saving mode (Yes in S30), and that the facsimile communication unit 26 is in the sleep state (Yes in S31). The wake-up unit 17 determines whether or not a time when the instruction receiver 16 received the instruction for selecting the facsimile communication unit 26 falls within the energy-saving priority period during which the energy-saving control unit 11 runs the energy saving mode preferentially (S41). The following description assumes that the energy-saving priority period is set to a period from 22:00 to 4:00, as an example.

In this case, the instruction receiver 16 received the instruction for selecting facsimile communication unit 26 transmitted from the multi-functional peripheral 1a at 22:30 in step S41 (Yes in S41). Hence the wake-up unit 17 determines the instruction was received during the priority period. The wake-up unit 17 then determines whether or not the selection instruction received by the instruction receiver 16 is the first selection instruction (a first selection instruction) received within the energy-saving priority period (S42).

In this example, the wake-up unit 17 determines in step S42 that the instruction for selecting the facsimile communication unit 26 transmitted from the multi-functional peripheral 1a, received by the instruction receiver 16, is the first selection instruction received within the energy-saving priority period (Yes in S42).

In this case, the wake-up unit 17 determines the time that is later by a predetermined first period (for example, 30 minutes) than the time when the first selection instruction was received within the energy-saving priority period, as a wake-up priority time. If the time that is later by the aforementioned first period from the time when the first selection instruction was received within the energy-saving priority period is out of the energy-saving priority period, the wake-up unit 17 determines a time earlier by a second period (for example, 5 minutes), which is shorter than the aforementioned predetermined first period, than the end time of the energy-saving priority period as a wake-up priority time. This means that the wake-up unit 17 determines a time within the energy-saving priority period and later than the time when the first selection instruction was received within the energy-saving priority period as a wake-up priority time. By way of example, the following descriptions assume that the wake-up unit 17 has determined 23:00 as a wake-up priority time. The 23:00 is 30 minutes later than 22:30, which is the time when the first selection instruction was received within the energy-saving priority period.

The wake-up unit 17 determines the determined wake-up priority time as a wake-up time when the operating unit instructed by the first selection instruction within the energy-saving priority period can be woken up (a first wake-up time) (S43). The wake-up unit 17 then replies communication information indicating the wake-up time (first communication information) to the multi-functional peripheral 1a (S36).

In another transmission-side multi-functional peripheral 1b (transmission-side device), on the other hand, the steps S12 to S13 are executed after an instruction for selecting the confidential reception function is accepted in step S11 (FIG. 4). The instructions for selecting the facsimile communication unit 26 and the and the image memory 25 that are an operating unit required at the time of running the confidential reception function (FIG. 3), are thus transmitted to the multi-functional peripheral 1c.

In the multi-functional peripheral 1c, on the other hand, the selection instructions, transmitted from multi-functional peripheral 1b, of the facsimile communication unit 26 and the image memory 25 are received by the instruction receiver 16 (Yes in S29). By way of example, the following descriptions assume that the selection instructions, transmitted from the multi-functional peripheral 1b, of the facsimile communication unit 26 and the image memory 25 were received at 22:40.

In this case, the wake-up unit 17 determines that the energy-saving control unit 11 is running the energy saving mode (Yes in S30), and that the facsimile communication unit 26 and the image memory 25 are suspended (Yes in S31). The wake-up unit 17 then determines whether or not the time when the instruction for selecting the facsimile communication unit 26 was received by the instruction receiver 16 falls within the energy-saving priority period (S41).

In this example, the instruction receiver 16 received the instruction for selecting the facsimile communication unit 26 at 22:40. The wake-up unit 17 determines that the instruction receiver 16 received the instruction within the priority period in step S41 (Yes in S41). Then the wake-up unit 17 does step S42, and determines that the selection instruction received by the instruction receiver 16 is not the first selection instruction received within the energy-saving priority period (No in S42).

In this case (No in S42), the wake-up unit 17 determines whether or not the current time, or the time when the instruction receiver 16 received the selection instructions (a second selection instruction) of the facsimile communication unit 26 and the image memory 25, is a wake-up priority time, or a wake-up time indicated by the communication information replied to the source from which the first selection instruction transmitted within the energy-saving priority period was transmitted (S44).

In this example; the instruction receiver 16 received the selection instructions of the facsimile communication unit 26 and the image memory 25 at 22:40. Hence the wake-up unit 17 determines in step S44 that the instruction receiver 16 received the instruction before the wake-up priority time, 23:00 (No in S44).

In this case (No in S44), the wake-up unit 17 determines a time that is later by a predetermined waiting period than the wake-up time indicated by the communication information transmitted earlier as the wake-up time (S45). The waiting period here is set to be larger than the maximum period that it takes to run a function instructed by the execution instruction received later in step S34. The following descriptions assume that the waiting period is set to be five minutes.

This means that, in this example, the wake-up unit 17 determines 23:05 as the wake-up time (a second wake-up time) in step S45. This wake-up time is five minutes later than 23:00, which is the wake-up time indicated by the communication information replied to the multi-functional peripheral 1a earlier. The wake-up unit 17 then replies the communication information indicating the wake-up time (second communication information) to the multi-functional peripheral 1b (S36).

As described above, in a case where another selection instruction was received within the reservation acceptance period (22:30 to 23:00), the wake-up unit 17 does not execute the wake-up process if the another operating unit indicated by the selection instruction is in the sleep state. The 22:30 is when the first selection instruction was received within the energy-saving priority period and the 23:00 is the wake-up time indicated by the communication information replied to the source from which the selection instruction was transmitted. The wake-up unit 17 then determines 23:05 as the wake-up time at which the another operating unit instructed by the selection instruction can be woken up. This wake-up time is later by a predetermined waiting period than 23:00, which is the wake-up time indicated by the communication information replied to the source from which the aforementioned first selection instruction was transmitted. The wake-up unit 17 then replies the communication information indicating the determined wake-up time (23:05) to the multi-functional peripheral 1b from which the another selection instruction was transmitted.

In the multi-functional peripheral 1a, on the other hand, when the communication information replied from the multi-functional peripheral 1c is received in step S14 (FIG. 4) (Yes in S14), the selection instruction transmitter 14 waits until 23:00, or the wake-up time indicated by the communication information (No in S16 in FIG. 4). Similarly in the multi-functional peripheral 1b, the communication information replied from the multi-functional peripheral 1c is received in step S14 (Yes in S14), the selection instruction transmitter 14 waits until 23:05, or the wake-up time indicated by the communication information (No in S16).

Now assume that it is after the wake-up priority time (23:00), or the wake-up time indicated by the communication information replied from the multi-functional peripheral 1c to the multi-functional peripheral 1a from which the first selection instruction transmitted within the energy-saving priority period was transmitted. In this case, in the multi-functional peripheral 1a, the selection instruction transmitter 14 transmits the instruction for selecting the facsimile communication unit 26 again (S13 in FIG. 4) because it is now after 23:00, or the wake-up time indicated by the communication information received in step S14 (FIG. 4) (Yes in S16 in FIG. 4).

As illustrated in FIG. 7, the multi-functional peripheral 1c receives the selection instruction transmitted again from the multi-functional peripheral 1a in step S29 before doing the steps S30, S31, S41, and S42. In step S42, the wake-up unit 17 determines that the selection instruction received by the instruction receiver 16 is not the first selection instruction received within the energy-saving priority period (No in S42). The wake-up unit 17 then determines that it is after the wake-up priority time 23:00 because the instruction for selecting the facsimile communication unit 26 was received by the instruction receiver 16 at 23:00 in step S44 (Yes in S44).

In this case (Yes in S44), the wake-up unit 17 executes the wake-up process (S33). This means that the wake-up unit 17 turns the switch 46 (illustrated in FIG. 2) ON to wake up the facsimile communication unit 26 from the sleep state.

The multi-functional peripheral 1a then instructs the execution of the relay transmission function and transmits the target data (S15 in FIG. 4). In response, the multi-functional peripheral 1c receives the execution instruction and runs the relay transmission function instructed by the received execution instruction (S34 and S35). The execution of the relay transmission function terminates at 23:05, when the aforementioned 5-minute waiting period has passed. After the execution of the relay transmission function terminates, step S22 (FIG. 5) is repeated.

In this case, even if the predetermined time limit has passed (Yes in S23) with no instruction for running a function being entered via the operation unit 21 (No in S22), the energy-saving control unit 11 will not resume the energy saving mode, as illustrated in FIG. 5. This is because the energy-saving control unit 11 is running the energy saving mode (No in S24). This means that the switch 46 (FIG. 2) remains ON after being turned ON by the wake-up unit 17 in step S33.

Now assume that it is now after 23:05, or the wake-up time indicated by the communication information the multi-functional peripheral 1c replied to the multi-functional peripheral 1b, which is the source from which the next selection instruction transmitted within the energy-saving priority period was transmitted. In this case, the multi-functional peripheral 1b transmits the instruction for selecting the facsimile communication unit 26 and the image memory 25 again (Yes in S16 in FIG. 4) because it is after 23:05, or the wake-up time indicated by the communication information received in step S14 (FIG. 4) (S13 in FIG. 4).

As illustrated in FIG. 7, the multi-functional peripheral 1c receives the selection instruction transmitted again from the multi-functional peripheral 1b in step S29 before doing the steps S30 and S31. Of the facsimile communication unit 26 and the image memory 25, which are operating units instructed by the selection instruction received in step S29, the facsimile communication unit 26 is awake but the image memory 25 is in the sleep state at the time of the execution of step S31. Hence at least one of the operating units instructed by the received selection instructions is determined to be suspended in step S31 (Yes in S31), and step S41, S42, and S44 are executed. In step S44, the instruction receiver 16 received the selection instructions of the facsimile communication unit 26 and the image memory 25 at 23:05. Hence the wake-up unit 17 determines in step S44 that the instruction receiver 16 received the instruction after the wake-up priority time 23:00 (Yes in S44).

In this case (Yes in S44), the wake-up unit 17 executes the wake-up process (S33). This means that the wake-up unit 17 keeps the switch 46 (FIG. 2) ON because it has already woken up the facsimile communication unit 26. Accordingly, the wake-up unit 17 keeps the facsimile communication unit 26 awake. In addition, the wake-up unit 17 turns the switch 45 (FIG. 2) ON to wake up the image memory 25 from the sleep state.

The multi-functional peripheral 1b then instructs the execution of the confidential reception function and transmits the target data (S15 in FIG. 4). In response, the multi-functional peripheral 1c receives the execution instruction and runs the confidential reception function instructed by the received execution instruction (S34 and S35). The execution of the confidential reception function terminates at 23:10, when the aforementioned 5-minute waiting period has passed. After the execution of the confidential reception function terminates, step S22 (FIG. 5) is repeated.

In this case, even if the predetermined time limit has passed (Yes in S23) with no instruction for running a function being entered via the operation unit 21 (No in S22), the energy-saving control unit 11 will not resume the energy saving mode, as illustrated in FIG. 5. This is because the energy-saving control unit 11 is running the energy saving mode (No in S24). This means that the switch 46 and 45 remain ON after being turned ON by the wake-up unit 17 in step S33.

In other words, the operating unit woken up through the wake-up process is kept awake from 23:00 to 23:10. The 23:00 is the wake-up time indicated by the communication information replied to the source from which the first selection instruction received within the energy-saving priority period was transmitted, and the 23:10 is 10 minutes later after that. The 10 minutes is a wake-up priority period represented by a product of the number of times (twice) the instruction receiver 16 received selection instructions within the aforementioned reservation acceptance period (the period between 22:30 and 23:00) and the waiting period (five minutes).

As described above, according to the configuration of the aforementioned second embodiment, if a first selection instruction is received within the energy-saving priority period, communication information indicating a wake-up priority time later than the wake-up time indicated by the first selection instruction will be replied as a wake-up time to the multi-functional peripheral 1 from which the first selection instruction was transmitted. Now assume that another selection instruction is then received during the reservation acceptance period, which is the period from the time at which the first selection instruction was received to a wake-up priority time, which is the wake-up time indicated by the communication information replied to the source from which the first selection instruction was transmitted. In this case, communication information indicating a wake-up time that is five minutes later will be replied to the multi-functional peripheral 1 from which the another selection instruction was transmitted. The five minutes is a predetermined waiting period from wake-up time indicated by the communication information replied to the multi-functional peripheral 1 from which the selection instruction received earlier was transmitted.

At the wake-up priority time, hence, for each predetermined waiting period, each selection instruction is transmitted again from each multi-functional peripheral from which the selection instructions received during the reservation acceptance period was transmitted. As a result, the reception-side multi-functional peripheral 1c can receive each selection instruction for each predetermined waiting period after the wake-up priority time. The wake-up unit 17 can in turn collectively and efficiently wake up the operating unit indicated by each selection instruction during a predetermined period after the wake-up priority time. As a result, compared with waking up the operating unit indicated by each selection instruction each time a selection instruction is received, the woken up operating unit instructed by the selection instruction received earlier is less apt to waste electric power until a next selection instruction is received.

In addition, the operating unit woken up through the wake-up process is kept awake during the wake-up priority period starting at a wake-up priority time. The wake-up priority period is represented by a product of the number of times the instruction receiver 16 received a selection instruction within the aforementioned reservation acceptance period and a waiting period. As a result, later at the time of running each function corresponding to each selection instruction received during the aforementioned reservation acceptance period, an occasion to wake up an operating unit to be used redundantly across each function can be limited to only the first occasion to wake up the operating unit to be used redundantly. This can reduce power consumption required to suspend and wake up each operating unit within the energy-saving priority period, compared with suspending the operating unit used to run each function each time the function is terminated within the energy-saving priority period.

Please note that the operation of the second embodiment, illustrated in FIG. 7, is merely an exemplary embodiment according to the disclosure and not intended to limit the disclosure to the second embodiment.

For example, in the aforementioned second embodiment, the wake-up unit 17 may cut off power supply to the operating unit used to run the function and suspend the operating unit in step S35 each time the function run by the operating unit woken up in step S33 terminates.

In addition, in each of the aforementioned embodiments, the selection instruction transmitter 14 may not do step S16 if communication information indicating a wake-up time is received (Yes in S14 in FIG. 4) after a selection instruction is transmitted in step S13 (FIG. 4). This means that the selection instruction transmitter 14 may not transmit a selection instruction again after the wake-up time indicated by the received communication information. The selection instruction transmitter 14 may display a warning that the operating unit instructed by a selection instruction cannot be woken up if communication information indicating a wake-up time is received (Yes in S14 in FIG. 4). This can be achieved by, for example, displaying on the display unit 211 information indicating that the operating unit instructed by the selection instruction transmitted in step S13 cannot be woken up. The selection instruction transmitter 14 may then terminate its operation without doing step S15.

The communication device according to the disclosure is not limited to a device mounted on an image forming apparatus such as the aforementioned multi-functional peripheral 1 but can be applied to any other communication devices capable of network communication, including a printer, a facsimile device, a scanner, a personal computer, a mobile phone, a microwave oven, a washing machine, a car navigation device, and a game console.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A communication device as a second communication device for communicating with a first communication device via an electric communication line, the first communication device having a power supply unit configured to generate an electric power, a facsimile communication unit configured to conduct facsimile communication with the second communication device, a plurality of operating units configured to receive the electric power generated by the power supply unit and operate, the plurality of operating units including the facsimile communication unit, and a main control unit configured to control the plurality of operating units, the main control unit including a central processing unit, a non-volatile memory, and a random access memory, wherein the main control unit operates as an energy-saving control unit configured to alternatively run a normal mode or an energy saving mode, the normal mode supplying the electric power to all of the plurality of operating units, the energy saving mode supplying the electric power to a predetermined part of the plurality of operating units and suspending another part of the plurality of operating units into a sleep state where the electric power is cut off, an instruction receiver configured to receive a selection instruction for selecting the operating unit that processes target data from the second device, and a wake-up unit configured to supply the electric power to the operating unit instructed by the selection instruction so as to wake up the operating unit instructed by the selection instruction from the sleep state upon receiving the selection instruction during the energy saving mode if the operating unit instructed by the selection instruction is in the sleep state, wherein the wake-up unit is configured not to execute the wake-up process and to reply communication information indicating a wake-up time to the second communication device if the instruction receiver receives the selection instruction during a reception inhibit period, the reception inhibit period inhibiting the waking up of the operating unit instructed by the selection instruction from the sleep state, the wake-up time being a time at which the operating unit instructed by the selection instruction can be woken up from the sleep state, wherein the instruction receiver receives the selection instruction again from the second communication device after the wake-up time, and wherein the facsimile communication unit receives the target data from the second communication device after the instruction receiver receives the selection instruction, the second communication device comprising:

an execution instruction transmitter configured to transmit a function execution instruction for making the first communication device execute a function and the target data to be processed by the function to the first communication device;

a selection instruction transmitter configured to transmit the selection instruction for selecting the operating unit required to operate at the time of running the function to the first communication device before the execution instruction transmitter transmits the execution instruction and the target data to the first communication device; and a communication control unit configured to communicate with the first communication device and receives the communication information indicating a wake-up time, wherein the selection instruction transmitter is configured to transmit the selection instruction again to the first communication device after the wake-up time when the communication control unit receives the communication information.

\* \* \* \* \*